(12) United States Patent
Farr et al.

(10) Patent No.: US 11,359,754 B2
(45) Date of Patent: Jun. 14, 2022

(54) FLEXIBLE PIPE ELEMENT AND METHOD FOR INSERTING A SEAL IN A FLEXIBLE PIPE ELEMENT

(71) Applicant: Witzenmann GmbH, Pforzheim (DE)

(72) Inventors: Matthias Farr, Friolzheim (DE); Jochen Glas, Tiefenbronn-Lehningen (DE); Thomas Herr, Pforzheim (DE); Stefan Keller, Tiefenbronn (DE)

(73) Assignee: Witzenmann GmbH, Pforzheim (DE)

( * ) Notice: Subject to any disclaimer, the term of this patent is extended or adjusted under 35 U.S.C. 154(b) by 219 days.

(21) Appl. No.: 15/044,247

(22) Filed: Feb. 16, 2016

(65) Prior Publication Data

US 2016/0238174 A1    Aug. 18, 2016

(30) Foreign Application Priority Data

Feb. 16, 2015    (DE) .......................... 102015102208.7

(51) Int. Cl.
| | | |
|---|---|---|
| *F01N 13/18* | (2010.01) | |
| *F16L 51/02* | (2006.01) | |
| *F16L 27/10* | (2006.01) | |
| *F01N 13/00* | (2010.01) | |
| *F16L 23/16* | (2006.01) | |

(52) U.S. Cl.
CPC ............ *F16L 51/025* (2013.01); *F01N 13/00* (2013.01); *F01N 13/1816* (2013.01); *F16L 23/162* (2013.01); *F16L 27/1004* (2013.01); *F01N 13/1827* (2013.01); *F01N 2260/10* (2013.01); *F01N 2470/12* (2013.01)

(58) Field of Classification Search
CPC . F01N 13/1816; F01N 2470/12; F16L 51/025
USPC ......................................... 285/903, 226, 223
See application file for complete search history.

(56) References Cited

U.S. PATENT DOCUMENTS

| | | | | |
|---|---|---|---|---|
| 2,113,211 | A * | 4/1938 | Lake ....................... | F16L 33/26 285/222.5 |
| 2,712,456 | A * | 7/1955 | McCreery ........... | F01N 13/1811 285/226 |
| 2,904,356 | A * | 9/1959 | Love ................... | F16L 27/0857 285/226 |

(Continued)

FOREIGN PATENT DOCUMENTS

| | | |
|---|---|---|
| DE | 102011112973 | 3/2013 |
| DE | 102013017871 | 7/2014 |

(Continued)

*Primary Examiner* — David Bochna
(74) *Attorney, Agent, or Firm* — Volpe Koenig

(57) ABSTRACT

A flexible pipe element is provided formed as a metal bellows with at least one corrugated bellows section and a bellows brim, which forms one end of the metal bellows, and a connection element for connecting the metal bellows to a continuing pipe part or to a connector, with the connection element having a connection area for abutting a contact area of the bellows brim. An annular bulge is formed in the contact area of the bellows brim and/or in the connection area of the connection element projecting beyond an average level of the contact area and/or an average level of the connection area in order to form a linear seal between the contact area and the connection area. A method for producing such a flexible line part is also provided.

11 Claims, 4 Drawing Sheets

(56) References Cited

U.S. PATENT DOCUMENTS

Figure 1:
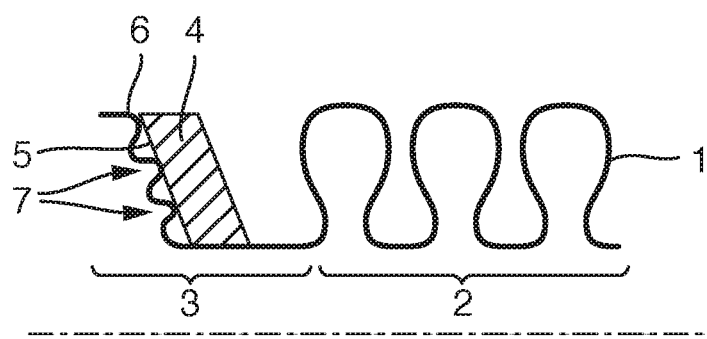

| | | | |
|---|---|---|---|
| 3,380,764 A * | 4/1968 | Wilson | F16L 33/224 |
| | | | 285/903 |
| 3,743,328 A * | 7/1973 | Longfellow | F16L 11/15 |
| | | | 285/903 |
| 3,747,367 A * | 7/1973 | Muller | F16D 3/74 |
| | | | 285/226 |
| 4,558,579 A | 12/1985 | Petkov et al. | |
| 5,538,294 A * | 7/1996 | Thomas | F16L 9/06 |
| | | | 285/903 |
| 5,794,986 A * | 8/1998 | Gansel | F16L 25/0036 |
| | | | 285/903 |
| 5,865,475 A * | 2/1999 | Winzen | F16L 25/0036 |
| | | | 285/226 |
| 6,199,592 B1 * | 3/2001 | Siferd | F16L 11/15 |
| | | | 285/903 |
| 6,276,728 B1 * | 8/2001 | Treichel | F16L 25/0036 |
| | | | 285/903 |
| 7,017,949 B2 * | 3/2006 | Luft | F16L 25/0036 |
| | | | 285/903 |
| 7,066,495 B2 * | 6/2006 | Thomas | F01N 13/1816 |
| | | | 285/226 |
| 7,350,826 B2 * | 4/2008 | Cantrell | F16L 25/0036 |
| | | | 285/903 |
| 7,607,700 B2 * | 10/2009 | Duquette | F16L 19/041 |
| | | | 285/903 |
| 8,308,201 B2 * | 11/2012 | Duquette | F16L 33/207 |
| | | | 285/903 |
| 8,997,794 B2 * | 4/2015 | Kwon | F16L 55/0337 |
| | | | 138/109 |
| 2015/0204470 A1 * | 7/2015 | Kim | F16L 27/111 |
| | | | 285/226 |

FOREIGN PATENT DOCUMENTS

| | | |
|---|---|---|
| EP | 0116111 | 8/1983 |
| EP | 2063079 | 5/2009 |

\* cited by examiner

FLEXIBLE PIPE ELEMENT AND METHOD FOR INSERTING A SEAL IN A FLEXIBLE PIPE ELEMENT

INCORPORATION BY REFERENCE

The following documents are incorporated herein by reference as if fully set forth: German Patent Application No. 102015102208.7, filed Feb. 16, 2015.

BACKGROUND

The invention relates to a flexible pipe element as well as a method for inserting a seal in such a flexible pipe element.

A flexible pipe element of the present type comprises a metal bellows with at least one corrugated bellows section and a bellows brim, which forms one end of the metal bellows. Further, it comprises a connection element for connecting the metal bellows to a continuing pipe part or to a connector. The connection element exhibits a connection area for abutting a contact area of the bellows brim.

A flexible pipe element of this type is described in DE 10 2011 112 973 A1. It is used particularly in exhaust systems for motor vehicles with an internal combustion engine and here particularly for generating a gas-tight and heat resistant connection between the exhaust manifold of the internal combustion engine and the other parts of the exhaust system. Here it shall particularly allow relative motions between the internal combustion engine and the exhaust system.

The connection element of this flexible pipe element of prior art is inserted in the connection brim of the metal bellows and welded thereto in order to create a stable and gas-tight connection between the connection brim and the connection element, which expands at the end of the bellows brim to form a flange element.

In order to allow the necessary high mobility of the flexible line part, particularly in exhaust systems of internal combustion engines, it is generally made however from thin-walled stainless steel, so that a welding connection to the connection element is not without problems. Simultaneously the connection element must have sufficient mass, thus be embodied with a sufficiently thick wall, to allow generating a gas-tight welded connection.

Due to the increasing demands with regards to noise emissions and the cleaning of exhaust of an internal combustion engine, such a gas-tight connection between the flexible line part of the present type and the continuing pipe parts or connectors is mandatory today. This is also true for other applications; the present invention is therefore not limited to the field of exhaust systems of an internal combustion engine.

EP 2 063 079 A1 suggests a flexible pipe element with a bellows section and a bellows brim as well as a connection element embodied as a flange part to form the sealing area of the flange part as an area curved convexly in its cross-section such that during the connection of such a modified flange part with a matching counterpart of a continuing pipe part or a connector a circumferential linear seal develops with sufficiently high area pressures for a metallic seal between the bellows brim and the flange part. However, for this purpose the flange part must be provided as a specialty part, which is generally associated with additional costs. Furthermore, it is also provided here to fasten the flange part by way of welding to the bellows brim, resulting in the above-stated problems.

In order to allow eliminating a welded connection, sometimes separate sealing elements are used in prior art, which are inserted between the connection area of the connection element and the contact area of the bellows brim and seal these two areas in reference to each other in a gas-tight fashion. However, a separate sealing element leads to additional costs. Furthermore, in many applications it bears the risk that during the insertion of the sealing element the work is not performed cleanly, so that it is not assembled in a correctly positioned fashion and consequently the connection is even less tight than without the separate sealing element.

SUMMARY

Starting with this prior art, the present invention is based on the objective of improving a flexible pipe element of the type mentioned at the outset such that it can also be connected without any welded connection to a continuing pipe part or a connector in a gas-tight fashion, without here requiring to insert a separate seal.

This objective is attained in a flexible pipe element having one or more features of invention. Preferred embodiments of the flexible pipe element according to the invention are described below and in the claims.

The present invention additionally attains the objective to provide a method for generating such a flexible pipe element, particularly for inserting the seal formed according to the invention by an annular bulge. This objective is attained in a method having one or more features of the invention. Preferred further developments of the method according to the invention are also disclosed below and in the claims.

The flexible pipe element according to the present invention differs from the above-described prior art such that an annular bulge is formed in the contact area of the bellows brim and/or the connection area of the connection element in order to form a linear seal between the contact area and the connection area. This annular bulge projects beyond an average level of the contact area and/or beyond an average level of the connection area, which allows the formation of the desired linear seal.

According to the method of the invention for producing such a flexible pipe element, as known per se, first the corrugated bellows section of the metal bellows is formed inside a tube, with a tube section essentially remaining non-deformed in order to form the bellows brim. Generally, at both sides a corrugated bellows section follows the bellows brim forming the two ends of the metal bellows. In order to allow connecting the metal bellows to a continuing pipe part or a connector, a connection element is pushed upon the bellows brim, and thereafter the bellows brim is conically widened at the end of the metal bellows. For example, in order to generate a V-brim connection the connection element can also be inserted therein, after a conical widening of the bellows brim. In both cases, based on the method according to the invention, the contact area of the bellows brim is located in its conically widened section. The annular bulge according to the invention is formed in the bellows brim, according to the method of the invention, namely during or after the widening of the bellows brim.

The connection element of the flexible pipe element according to the invention may represent a flange or a conical flange part for placement of a V-brim clamp. Since a welded connection is not required, here, these elements can advantageously show relatively thin walls.

Preferably the annular bulge according to the invention for the formation of a linear seal between the bellows brim and the connection element is embodied as a bead, preferably with a rounded profile, which at least in its central section is formed convexly. The rounded profile avoids any notching effect, and the convex shape in the central section of the profile ensures the desired linear sealing effect when abutting the contact area of the bellows brim and/or the connection area of the connection element.

The annular bulge can be inserted in the bellows brim or in the connection element in a particularly uncomplicated fashion when it is embodied as a corrugated deformation of the bellows brim or the connection element. In particular, the insertion of the annular bulge in the bellows brim, as provided in the method according to the invention, is possible in such an uncomplicated fashion, for example by rolling, using hydroforming in a matrix or deformation in a press. This processing step is preferably performed simultaneously with the conical widening of the bellows brim, which advantageously can occur usually in a single tool.

Within the scope of the present invention, depending on the respective application, it may be advantageous to form not only one annular bulge according to the invention, but to form two or more bulges in the contact area of the bellows brim and/or in the connection area of the connection element.

Also, depending on the application, it may be advantageous within the scope of the present invention, that the metal bellows of the flexible pipe element is formed from at least two layers of an austenitic stainless steel tape, preferably having a thickness of 0.3 mm or more.

The latter is primarily advantageous when the flexible pipe element according to the invention is intended for the installation in an exhaust system of a large diesel or gasoline engine and embodied such that it can withstand internal pressures of more than 3 bar, preferably 3.5 to 4 bar, as well as internal temperatures of up to 850° C. In this application the present invention provides particular advantages, because here potential leaks at the connection site of the flexible pipe element are of particular importance. Such leaks lead to performance loss of the internal combustion engine, and downtimes are here connected to particularly high costs.

However, the present invention can also be realized with flexible pipe elements, produced from other materials, such as heat-resistant steel, nickel-base alloys, aluminum, copper, and other metals. They may be processed in a single-ply, two-ply, or multi-ply form, with perhaps different layers being made from different materials.

Both the single-ply as well as the multi-ply flexible pipe elements may be produced from band-shaped materials, with their thickness adjusted to the application, thus they may also perhaps be considerably smaller than the above-mentioned 0.3 mm, e.g., 0.25 mm, 0.2 mm, 0.15 mm, or 0.1 mm.

Figure 2:
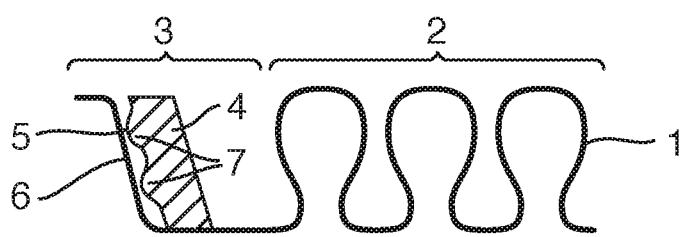
Figure 3:
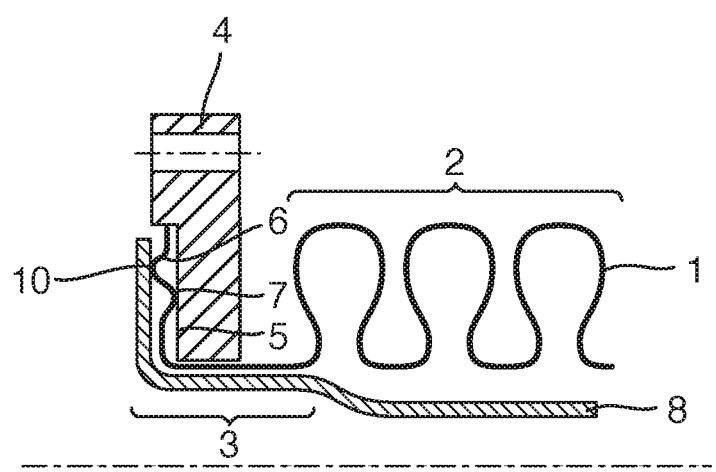
Figure 4:
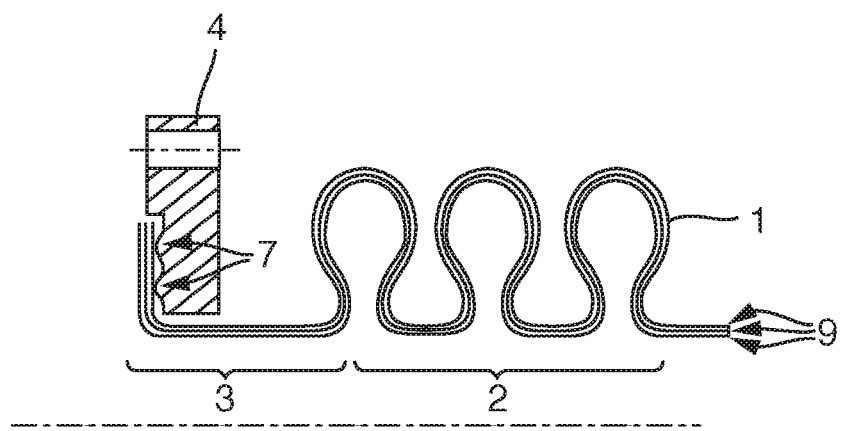
Figure 5:
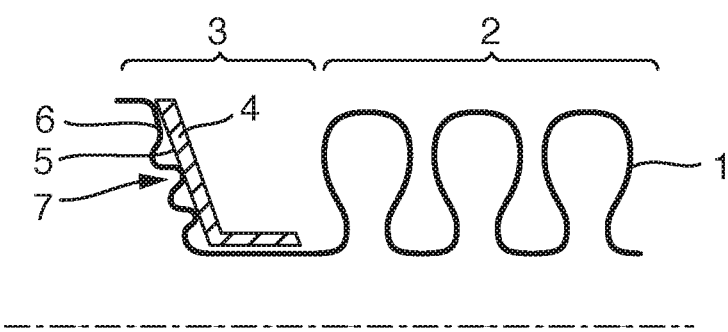
Figure 6:
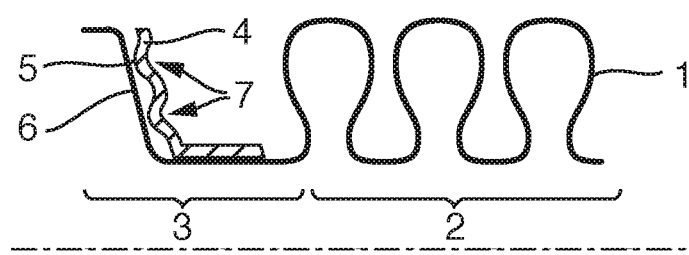
Figure 7:
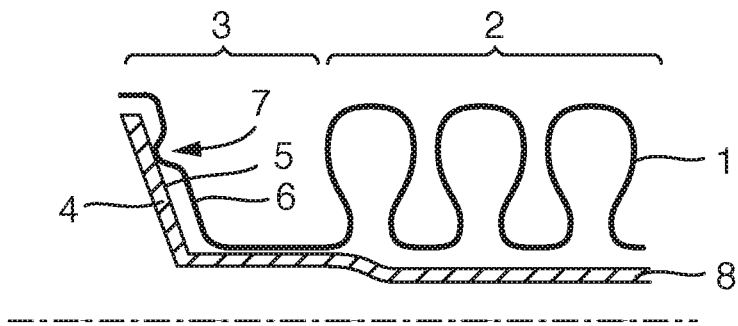
Figure 8:
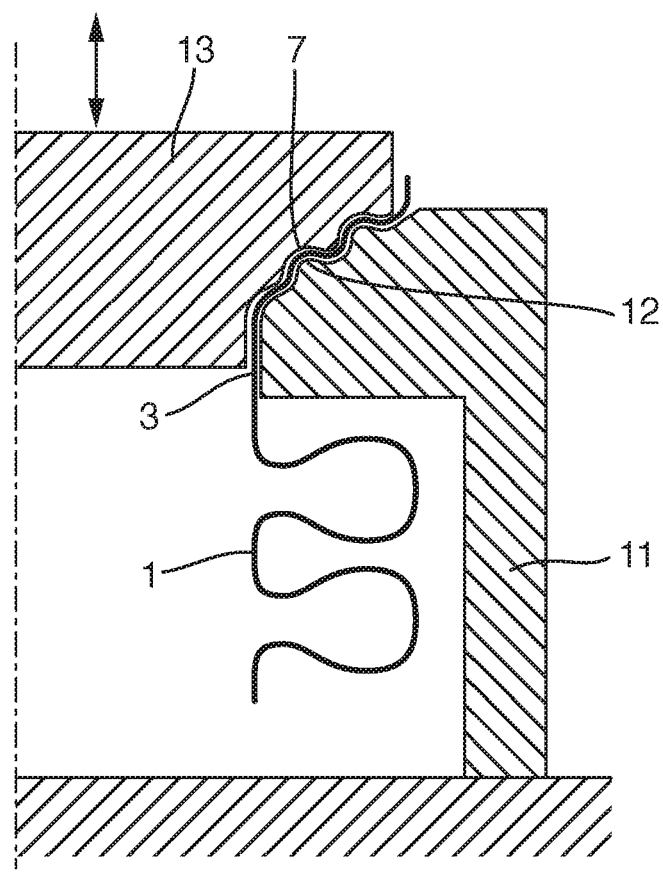
Figure 9:
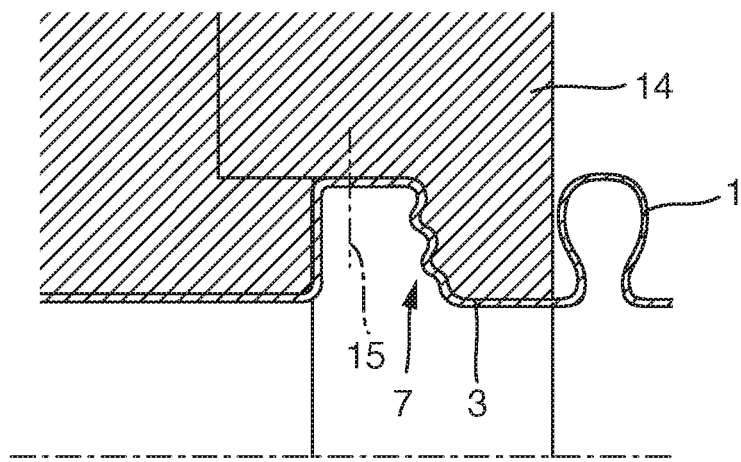
Figure 10:
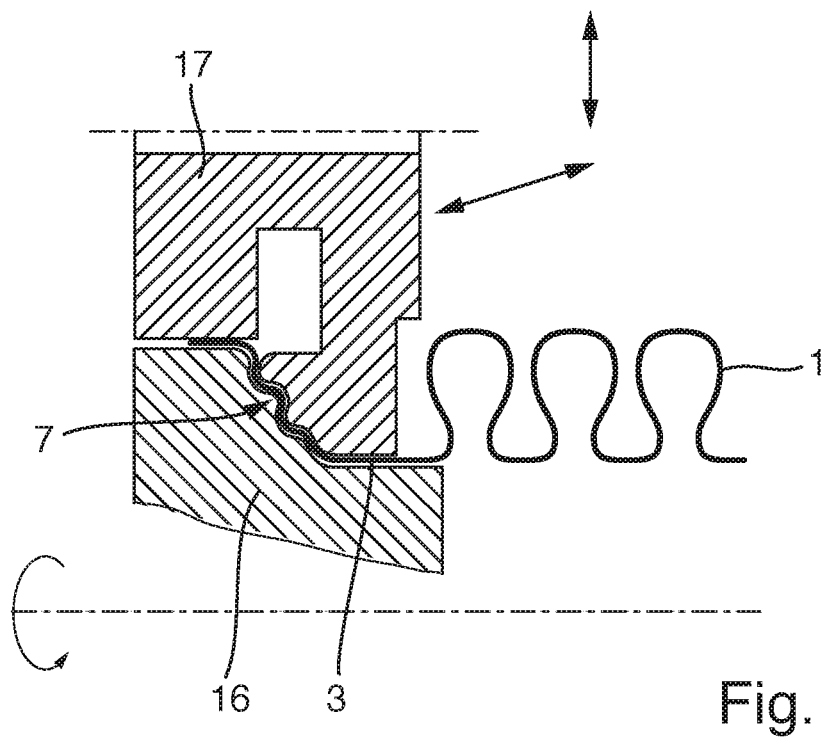

In the following, several exemplary embodiments for flexible pipe elements embodied according to the invention are described and explained in greater detail based on the attached drawings. Shown are:

FIG. 1 a schematic partial cross-section through a first exemplary embodiment;

FIG. 2 a schematic partial cross-section through a second exemplary embodiment;

FIG. 3 a schematic partial cross-section through a third exemplary embodiment;

FIG. 4 a schematic partial cross-section through a fourth exemplary embodiment;

FIG. 5 a schematic partial cross-section through a fifth exemplary embodiment;

FIG. 6 a schematic partial cross-section through a sixth exemplary embodiment;

FIG. 7 a schematic partial cross-section through a seventh exemplary embodiment;

FIG. 8 a schematic cross-section when implementing an exemplary embodiment of the method according to the invention;

FIG. 9 a schematic cross-section when implementing a second exemplary embodiment of the method according to the invention; and FIG. 10 a schematic cross-section when implementing a third exemplary embodiment of the method according to the invention.

DETAILED DESCRIPTION OF THE PREFERRED EMBODIMENTS

FIGS. 1 to 7 respectively show a schematic cross-section of a detail of the flexible pipe element embodied according to the invention. It comprises a metal bellows 1 with a corrugated bellows section 2 and a bellows brim 3, as well as a connection element 4.

In FIG. 1 the connection element 4 comprises a conical flange part, which can be placed upon a V-brim clamp (not shown), in order to connect the metal bellows 1 via a V-brim connection. The connection element 4 is here placed onto the bellows brim 3 before said brim was conically widened. A connection area 5 of the connection element 4 faces the bellows brim 3 and abuts it in a contact area 6.

The conically widened section of the bellows brim 3 is deformed in a wave-like fashion, so that two annular bulges 7 are formed, which project towards the connection area 5 of the connection element 4 beyond an average level of the bellows brim 3 and/or its contact area 6 in a convex fashion, and this way generate two linear seals on the here planar embodied connection area 5 of the connection element 4.

FIG. 2 shows a similar exemplary embodiment as FIG. 1. Here, too, the connection element 4 comprises a conical flange part for placing a V-brim clamp onto it, and again the connection element 4 abuts with a connection area 5 via a contact area 6 of the bellows brim 3, with this contact area 6 being located in a conically expanded section of the bellows brim 3.

Unlike the exemplary embodiment according to FIG. 1, here instead of the bellows brim 3, the connection element 4, more precisely its connection area 5, is provided with two annular bulges 7. They project convexly beyond an average level of the connection area 5 and ensure a linear sealing between the connection area 5 and the contact area 6.

In the exemplary embodiment shown in FIG. 3 the connection element 4 comprises a flange, which in turn is placed upon the bellows brim 3, before it had been widened conically. The flange 4 shows a connection area 5, by which it abuts a contact area 6 of the widened bellows brim 3. Similar to the exemplary embodiment according to FIG. 1, the bellows brim 3 is provided with a corrugated deformation, which forms a convexly projecting, annular bulge 7, which generates a linear seal between the bellows brim 3 and the connection element 4.

Additionally, the flexible pipe element shown in FIG. 3 is provided with an internal tube 8, which is widened in the proximity of the bellows brim 3 and abut it there. Towards the end of the flexible pipe element, the internal tube 8 is deformed like a collar, so that it accepts the widened section of the bellows brim 3 between itself and the connection element 4. The corrugated deformation of the bellows brim 3 is shaped in the present exemplary embodiment such that not only an annular bulge 7 is formed towards the connection area 5 of the connection element 4, but also another bulge 10 towards the internal tube 8, so that here a linear seal is generated, when the flange connection is produced by the connection element 4.

The exemplary embodiment shown in FIG. 4 again has a flange as the connection element 4, with here the connection area 5 of the flange, similar to FIG. 2, being provided with two convexly projecting annular bulges 7, by which the desired linear seal can be generated between the bellows brim 3 and the connection element 4.

In this exemplary embodiment the metal bellows 1 is formed from 3 layers 9 of an austenitic stainless steel, resulting in the metal bellows 1 becoming particularly pressure and temperature resistant, in spite of the fact that its corrugations exhibit the desired flexibility.

FIG. 5 shows an exemplary embodiment, which is largely equivalent to the exemplary embodiment of FIG. 1. However, here the connection element 4, provided to produce a V-brim connection, is embodied considerably thinner than the conical flange part of FIG. 1, which naturally saves material. Due to the fact that according to the invention it is not necessary to generate a welding connection between the connection element 4 and the bellows brim 3, since the annular bulge 7 in the bellows brim 3 generates a linear seal between the bellows brim 3 and the connection area 5 of the connection element 4, the connection element 4 can advantageously be embodied thin, as shown in FIG. 5.

FIG. 6 shows a very similar exemplary embodiment. The difference to the exemplary embodiment according to FIG. 5 comprises here that the annular bulges 7 are not inserted in the contact area 6 of the bellows brim 3 (FIG. 5) but in the connection area 5 of the connection element 4 (FIG. 6). Due to the fact that in the present case the connection element 4 is advantageously embodied in a thin fashion, the annular bulges 7 for the generation of a linear seal by a corrugated deformation of the connection element 4 could be formed therein, which can be accomplished comparatively easily.

FIG. 7 shows an exemplary embodiment comprising many similarities with the exemplary embodiment of FIG. 3. For example, the flexible pipe element shown here also comprises an internal tube 8, which together with the bellows brim 3 is conically widened towards the end of the metal bellows 1. Here it forms the connection element 4 of the present invention, with it abutting with its contact area 5 the contact area 6 of the bellows brim 3. An annular bulge 7 is formed in the bellows brim 3, which ensures the linear sealing according to the invention between the bellows brim 3 and the connection element 4.

FIGS. 8 to 10 show as examples three possibilities of how the method according to the invention can be implemented. Here, each time the bellows brim 3 of the metal bellows 1 is simultaneously widened in a conical fashion and provided with a wave-like deformation in order to form two annular bulges 7 according to the invention in the bellows brim 3.

In the exemplary embodiment shown in FIG. 8 the metal bellows 1 is inserted into a fixed press base 11, which is provided with convex projections 12 in the area on which the bellows brim 3 to be widened conically comes to rest. With a mobile press top 13, articulate in a vertical fashion, the bellows brim 3 is deformed in the desired fashion by way of pressing against the fixed press top 11.

FIG. 9 shows the implementation of another exemplary embodiment of a method according to the invention. Here, the bellows brim 3 is hydraulically formed in a matrix 14 using hydroforming, with both the conical widening of the bellows brim 3 as well as the corrugated deformation being generated to form the annular bulges 7. After the deformation step, shown in FIG. 9, the bellows brim 3 is cut off at a separating line 15. The shaping shown here of the seals integrated in the bellows brim 3 can also occur simultaneously with the forming of the corrugated bellows section of the metal bellows 1.

FIG. 10 shows finally a third method for forming the annular bulges 7 according to the invention in the bellows brim 3 of the metal bellows 1. Here, the metal bellows 1 is placed onto a rotating tool 16, thereafter a pressure roll 17 to be diagonally approached widens the bellows brim 3 by way of tumbling, and simultaneously the annular bulges 7 are implemented in the form of a corrugated deformation of the bellows brim 3.

The invention claimed is:

1. A combination of a flexible pipe element and a V-brim clamp, comprising a metal bellows (1) with at least one corrugated bellows section (2) and a bellows brim (3) at an end thereof that forms one end of the metal bellows (1), a connection element (4) for connecting the metal bellows (1) to a continuing pipe part or to a connector, the connection element (4) comprising a connection area (5) for abutting a contact area (6) of the bellows brim (3), at least one line contact seal that exclusively seals the metal bellows to the connection element, the at least one line contact seal including an annular bulge (7) formed in the contact area (6) of the bellows brim (3) or in the connection area (5) of the connection element (4) projecting beyond an average level of the contact area (6) or an average level of the connection area (5), or in both the contact area and the connection area, the annular bulge being formed as a bead with an apex that forms the line contact seal between the contact area (6) and the connection area (5), and the connection element comprises a flange or a conical flange part that is received in the V-brim clamp.

2. The combination according to claim 1, wherein the annular bulge (7) is embodied as a corrugated deformation of the bellows brim (3) or the connection element (4), or both the bellows brim and the connection element.

3. The combination according to claim 2, wherein the annular bulge (7) has a rounded profile, which is formed convexly at least in a central section.

4. The combination according to claim 1, wherein two or more of the annular bulges (7) are formed in the contact area (6) of the bellows brim (3) or in the connection area (5) of the connection element (4) or both, to form at least two of the line contact seals.

5. The combination according to claim 1, wherein the flexible pipe element is adapted for installation in an exhaust system of a diesel or gasoline engine and embodied such that it withstands internal pressures of more than 3 bar and an internal temperatures of up to 850° C.

6. The combination according to claim 1, wherein the metal bellows (1) is produced from at least two layers (9) of an austenitic stainless steel band.

7. The combination according to claim 1, wherein the metal bellows (1) is produced from at least two layers (9) of an austenitic stainless steel band having a thickness of 0.3 mm or more.

8. The combination according to claim 1, further comprising an internal tube (8) arranged inside the metal bellows (1), the internal tube (8) conically widens together with the bellows brim (3) towards the end of the metal bellows (1) and abuts therewith, at least one annular bulge (10) being formed in the internal tube (8) or in the bellows brim (3), or both, in order to form a linear seal between the internal tube (8) and the bellows brim (3).

9. A method for producing the flexible pipe element for the combination according to claim 1, comprising:

forming the corrugated bellows section (2) of the metal bellows (1) in a tube and having a tube section remaining essentially non-deformed, in order to form the bellows brim (3), and conically widening the bellows brim (3) towards the end of the metal bellows (1), with previously placing a connection element (4) onto the bellows brim (3) or thereafter inserting a connection element (4) into the bellows brim (3), and forming the at least one annular bulge (7) in the bellows brim (3) during or after the widening of the bellows brim (3).

10. The method according to claim 9, wherein the formation of the annular bulge (7) occurs by rolling, by hydroforming in a matrix (14), or in a press (11, 13).

11. The method according to claim 9, wherein the annular bulge (7) is inserted as a corrugated deformation in the bellows brim (3).

\* \* \* \* \*